United States Patent
Critelli et al.

(10) Patent No.: US 6,275,745 B1
(45) Date of Patent: Aug. 14, 2001

(54) SYSTEM AND METHOD FOR VERIFYING THE DELIVERY OF A MAILING AND THE MATERIAL CONTAINED WITHIN THE MAILING

(75) Inventors: Michael J. Critelli, Darien; Ronald Reichman, Trumbull; Steven J. Shapiro, Monroe, all of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/372,722

(22) Filed: Aug. 11, 1999

(51) Int. Cl.[7] .................. G06F 7/00; G06K 5/00
(52) U.S. Cl. .......................... 700/227; 235/380
(58) Field of Search ............ 700/90, 227, 115; 705/401, 28; 235/492, 487, 380

(56) References Cited

U.S. PATENT DOCUMENTS

| | | | |
|---|---|---|---|
| 4,831,555 | 5/1989 | Sansone et al. | 364/519 |
| 5,153,842 * | 10/1992 | Clugos, Sr. et al. | 364/478 |
| 5,288,994 | 2/1994 | Berson | 250/223 R |
| 5,340,968 * | 8/1994 | Watanabe | 235/462 |
| 5,557,096 * | 9/1996 | Watanabe | 235/492 |
| 5,684,705 * | 11/1997 | Herbert | 364/464.11 |
| 5,875,434 * | 2/1999 | Matsuoka | 705/28 |
| 5,917,178 * | 6/1999 | De Hoog | 235/492 |
| 5,949,059 * | 9/1999 | Rawson | 235/487 |
| 5,963,927 * | 10/1999 | Herbert | 705/401 |
| 5,971,587 * | 10/1999 | Kato | 700/115 |
| 6,010,075 * | 1/2000 | Ishifuji | 235/492 |

* cited by examiner

Primary Examiner—William Grant
Assistant Examiner—Ronald D Hartman, Jr.
(74) Attorney, Agent, or Firm—Ronald Reichman; Michael E. Melton; Robert E. Meyer (57) ABSTRACT

A system and method for relating the delivery of a mail piece or package to what is inside the mail piece or package. Thus, when the mail piece or package is received and signed for by a recipient the mailer will have proof that the recipient received the mail piece or package and what was inside the mail piece or package at the time the mail piece or package was delivered to the recipient. The foregoing is accomplished by: affixing identifying characteristics to material contained within the container; sealing the container along with the material contained within the container; delivering the container along with the material contained within the container to a recipient; reading recipient information appearing on the outside of the container and the identifying characteristics of the material contained within the container without opening the container; and recording recipient information appearing on the outside of the container and the identifying characteristics of the material contained within the container without opening the container; and recording recipient's signature.

21 Claims, 6 Drawing Sheets

| 71 | DELIVERY RECEIPT | |
|---|---|---|
| 72 — MAILER:<br><br>MR. JOHN H. JONES | RECIPIENT:<br><br>MR. JOHN H. SMITH | — 73 |
| 74 — MAILER ADDRESS:<br><br>44 ROAD END<br>WESTON, CT 06883 | RECIPIENT ADDRESS:<br><br>2110 OCEAN AREA<br>BROOKLYN, NEW YORK 11230 | — 75 |
| 76 | DATE AND TIME MATERIAL PACKED:<br><br>FEBRUARY 18, 1999   9:30 a.m. | |
| 77 | DATE AND TIME MATERIAL DELIVERED:<br><br>FEBRUARY 20, 1999   11:20 a.m. | |
| 78 | DESCRIPTION OF MATERIAL:<br><br>WATCH | |
| 79 | INFORMATION FROM POSTAL INDICIA:<br><br>9678432165C9 | |
| 80 | INFORMATION FROM MATERIAL:<br><br>36429705A69 | |
| 81 | RECIPIENT SIGNATURE: | |

SYSTEM AND METHOD FOR VERIFYING THE DELIVERY OF A MAILING AND THE MATERIAL CONTAINED WITHIN THE MAILING

CROSS REFERENCE TO RELATED APPLICATION

Reference is made to commonly assigned co-pending patent application No. 09/372,254 filed concurrently herewith entitled "Postage Meter That Provides On A MailPiece Evidence Of Postage Paid Together With Cryptographically Secured, Third Party Certified, Non-Shipping Information About The Sender Of The Mailpiece" in the name of Michael J. Critelli.

FIELD OF THE INVENTION

The invention relates generally to the field of mail delivery methods and systems and more particularly to systems and methods for relating the material contained within a mail piece or package to the name and address of the recipient of the mail piece or package.

BACKGROUND OF THE INVENTION

Ever since the numeric codification of streets and buildings received general acceptance, an individuals' name and their household postal addresses have been linked. The sender of a mail piece or package would deliver a mail piece or package to the post or a courier that had the correct recipient postal address, and the post or courier would deliver the mail piece or package to the numeric street address of the recipient of the mail piece or package. A correct recipient postal address for the delivery of the mail piece or package to the recipient included: the name of the recipient; the street address of the recipient; the city and state of the recipient; and the zip code of the recipient. Thus, the correct recipient postal address is usually the actual location of the recipient.

The post has created special delivery services for important and/or valuable mail pieces, i.e., certified mail, registered mail, etc., and special services for packages, i.e. insurance. Courier services have also utilized special delivery services for important and/or valuable mail pieces and packages. When some special services are requested by the mailer the post and courier services ask the recipient to sign for the delivery of the mail piece or the package. The post and courier services have sent the mailer a certificate bearing the recipient's signature indicating that the recipient received the mail piece or package. The mailer had no proof that the recipient received the contents of the mail piece or package. For instance, tenants sometimes argued in court that they did not receive an eviction notice from their landlord. Recipients of packages sometimes stated to the mailer that certain items that were shipped were not shipped. For instance, recipients sometimes complained they did not receive their watches, electronic devices, etc. The prior art did not tie or relate the delivery of the mail piece or package to what was inside the mail piece or package.

The foregoing problem may occur more frequently as larger amounts of goods are ordered from catalogues or via the internet and shipped to the customer.

SUMMARY OF THE INVENTION

This invention overcomes the disadvantages of the prior art by tying or relating the delivery of a mail piece or package to what is inside the mail piece or package. Thus, when the mail piece or package is received and signed for by a recipient, the mailer will have proof that the recipient received the mail piece or package and what was inside the mail piece or package at the time the mail piece or package was delivered to the recipient. The foregoing is accomplished by: affixing identifying characteristics to material contained within the container; sealing the container along with the material contained within the container; delivering the container along with the material contained within the container to a recipient; reading recipient information appearing on the outside of the container and the identifying characteristics of the material contained within the container without opening the container; and recording recipient information appearing on the outside of the container and the identifying characteristics of the material contained within the container without opening the container; and recording recipient's signature. The identifying characteristics of the material contained within the container may be in the form of a unique code that appears on the material contained within the container that specifically identifies the material contained within the container. Hence, the post or courier will be able to certify to the mailer the materials that have been delivered to the recipient.

DETAILED DESCRIPTION OF THE PREFERRED EMBODIMENT

Figure 1:
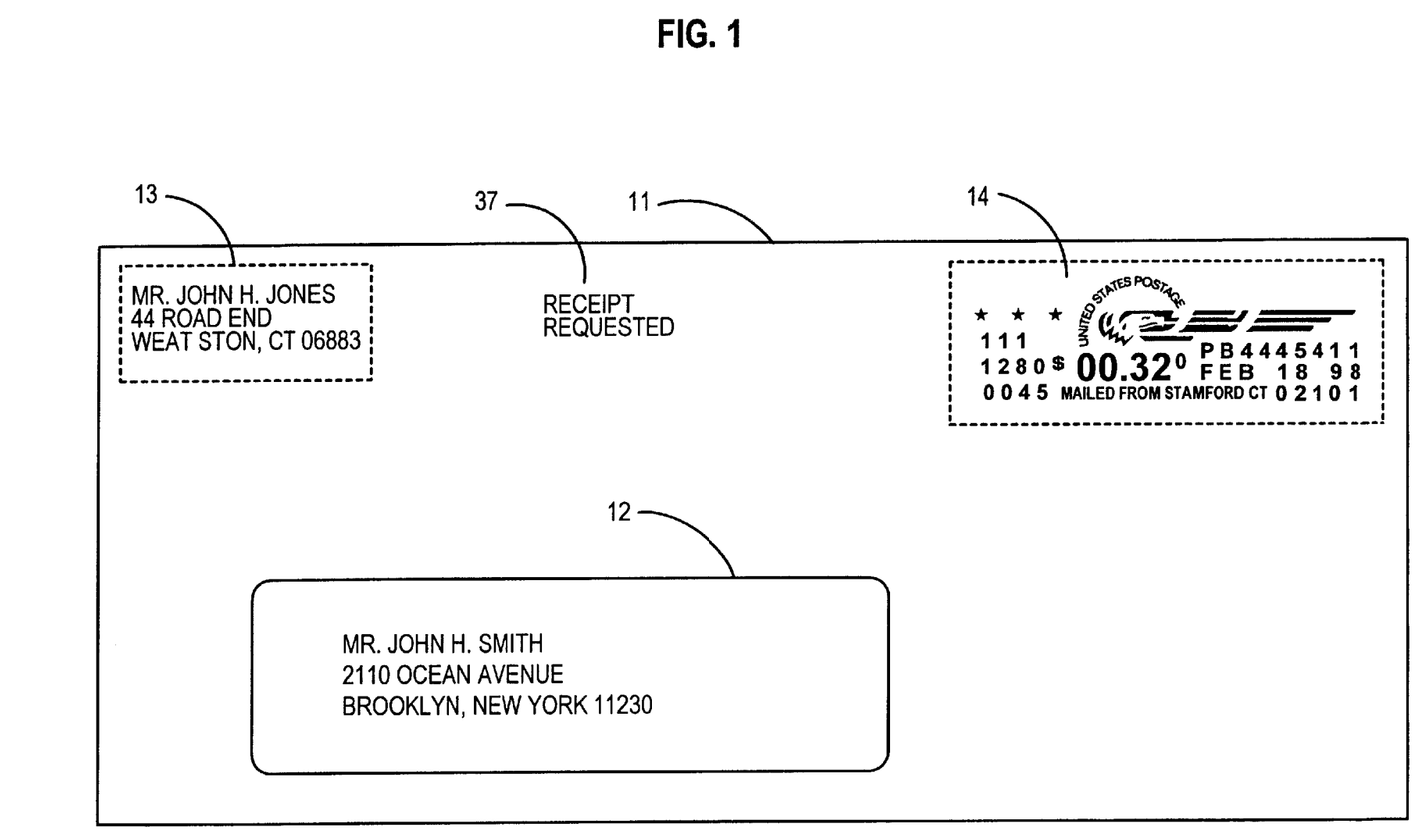
FIG. 1 is a drawing showing a mail piece or package (container) that has been sealed.

Referring now to the drawings in detail, and more particularly to FIG. 1, the reference character 11 represents a mail piece or package (container) that has been sealed. Container 11 has a recipient address field 12 and a sender or mailer address field 13. A postal indicia 14 is affixed to container 11. Container 11 may include a special services receipt requested symbol 37. Symbol 37 informs the postal carrier or courier that the recipient must sign a receipt 71 (described in the description of FIG. 7), when they receive container 11. Couriers may replace indicia 14 with coded information, i.e., a bar code, and remove symbol 37.

Figure 2:
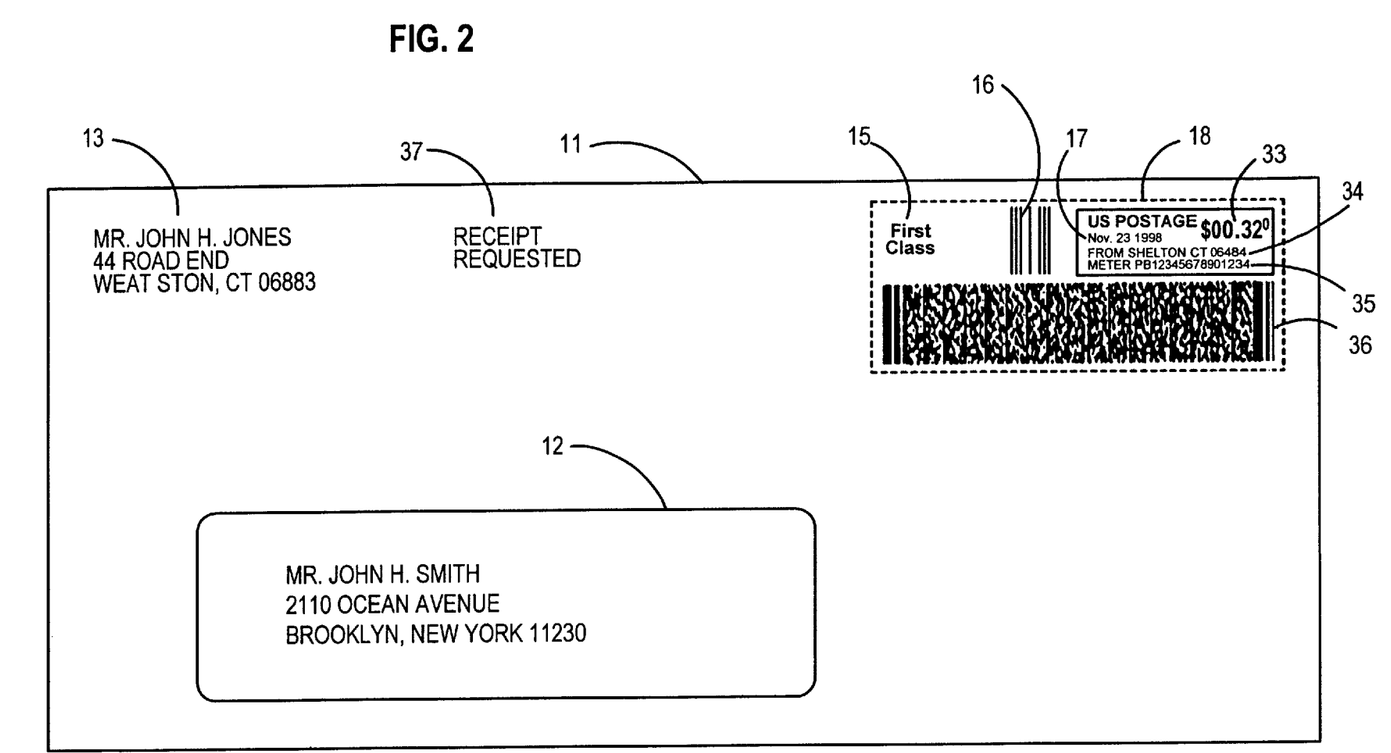
FIG. 2 is a drawing of a sealed mail piece or sealed package 11 containing an Information—Based Indicia and a special service that has been requested by the mailer.

FIG. 2 is a drawing of a sealed mail piece or sealed package 11 containing an Information—Based Indicia and a special service that has been requested by the mailer. Container 11 has a recipient address field 12 and a sender address field 13. Container 11 also contains a United States Postal Service Information—Based Indicia (IBI) 18 and a special services receipt requested symbol 37. The indicia 18 contains a dollar amount 33, the date 17, that the postal indicia was affixed to container 11, the place 34 that container 11 was mailed, the postal security device serial number 35, the class of mail 15, a FIM code 16 and a 2D encrypted bar code 36. Bar code 36 is a unique number that is derived from address field 12 and information contained in the postal security device that affixed IBI 18. The manner in which bar code 36 is obtained is disclosed in the Sansone, et al. U.S. Pat. No. 4,831,555 entitled "UNSECURED POSTAGE APPLYING SYSTEM," herein incorporated by reference.

Figure 3:
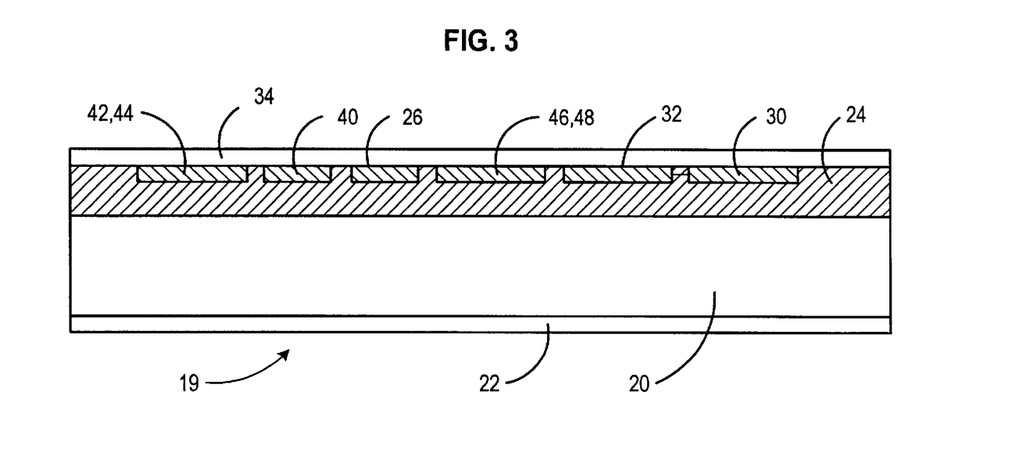
FIG. 3 is a drawing showing the cross section of electronic circuit 19 that is affixed to the material contained within sealed container 11.

FIG. 3 is a drawing showing the cross section of frangible electronic circuit 19 that is affixed to the material contained within sealed container 11. Electronic circuit 19 is produced on a thin substrate, such as a paper layer 20, which, preferably, has an adhesive layer 22 for affixing circuit 19 to the material contained within container 11 (FIG. 1). Circuit 19 also includes an electronic material layer 24 to contain all the necessary electronic components, and a composite window layer 34 which may also serve as a protective layer to electronic material layer 24. Preferably, the electronic components in the electronic material layer 24 are made from an amorphous semiconductor material. Contained in the electronic material layer 24 adjacent the composite window layer are a sensor 32, a signal transmitter 30 to allow circuit 19 to communicate with external devices, a power pick up 46 to receive power from an external radio frequency source, an energy storage device 48, a display unit 26, a controller 40, and memories 42 and 44.

Figure 4:
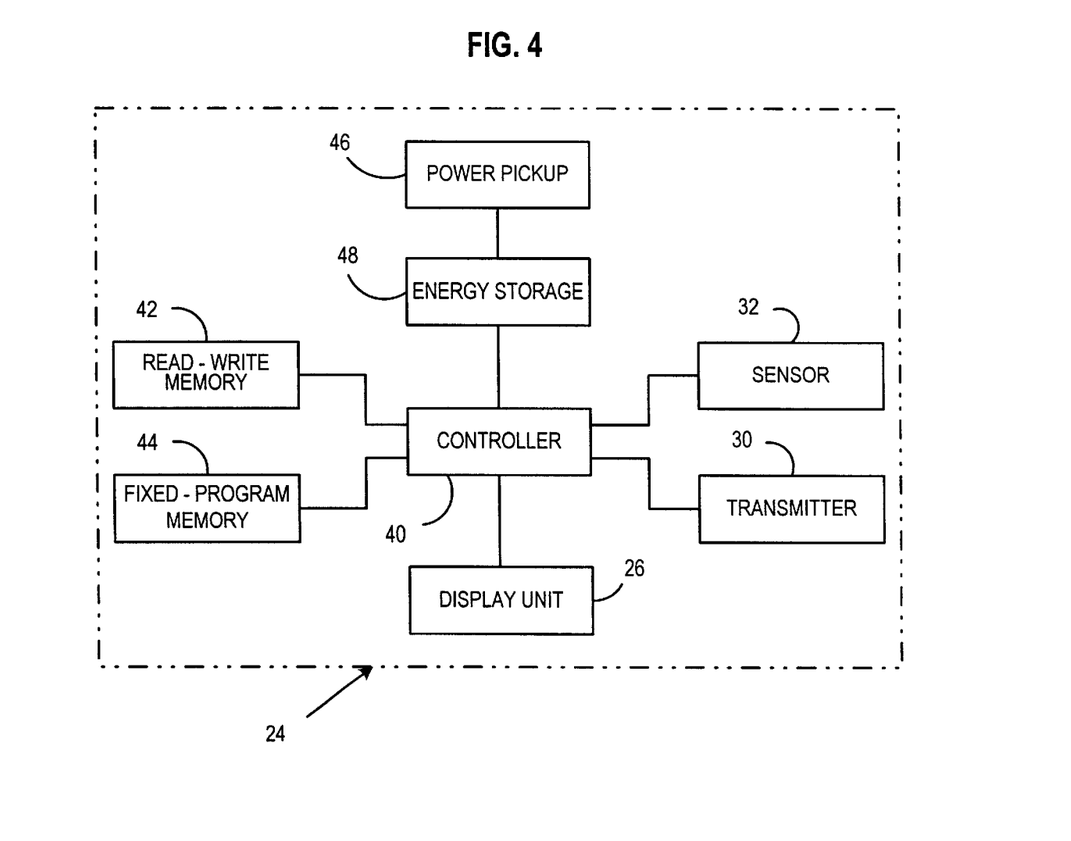
FIG. 4 is a drawing in block form showing the electronic components included in layer 24 of electronic circuit 19.

FIG. 4 is a drawing in block form showing the electronic components included in layer 24 of electronic circuit 19. As shown, layer 24 includes a processing unit or controller 40, a read/write memory 42 for storing the serial number or other identifying characteristics of the materials contained within sealed container 11 (FIGS. 1 and 2). Memory 42 may also contain the date and time the materials were sealed into container 11 and the recipient address of container 11. An optional fixed-program memory 44 for storing mailer information, i.e., name and address of the mailer, etc., may also be included in memory 44. Layer 24 also includes a sensor 32 to receive information from an external device and a transmitter 30 to transmit information. Preferably, sensor 32 is an electrical sensor for receiving electrical signals. Transmitter 30 may comprise a radio frequency transmitter to provide radio frequency signals. It is preferred that layer 24 is activated only when it is in the proximity of a postal or courier reading device. Thus, it is preferable that circuit 19 include a power pickup unit 46 to receive power from an external radio frequency source i.e., the postal or courier reading device, and an energy storage device 48 to provide power to controller 40, display unit 26, sensor 32, transmitter 30, and memories 42 and 44. Energy storage device 48 may comprise one or more capacitors, and voltage controlling means. Display unit 26 is used to produce visible markings that uniquely identify the materials contained within sealed container 11. Display unit 26 may include an electrophoresis material so that it can be activated to form a visible and permanent code. The visible and permanent code is a unique code that may combine the serial number or other identifying characteristics of the materials contained within sealed container 11 with the time and date that the materials were sealed into container 11. It will be obvious to one skilled in the art that other information may be used to produce the unique code, and that the unique code may be encrypted. It is understood that unit 26 is controllable by controller 40 so that the visible patterns are only produced when required. Display unit 26 can also be used to produce a barcode or other human readable or machine readable information.

Figure 5:
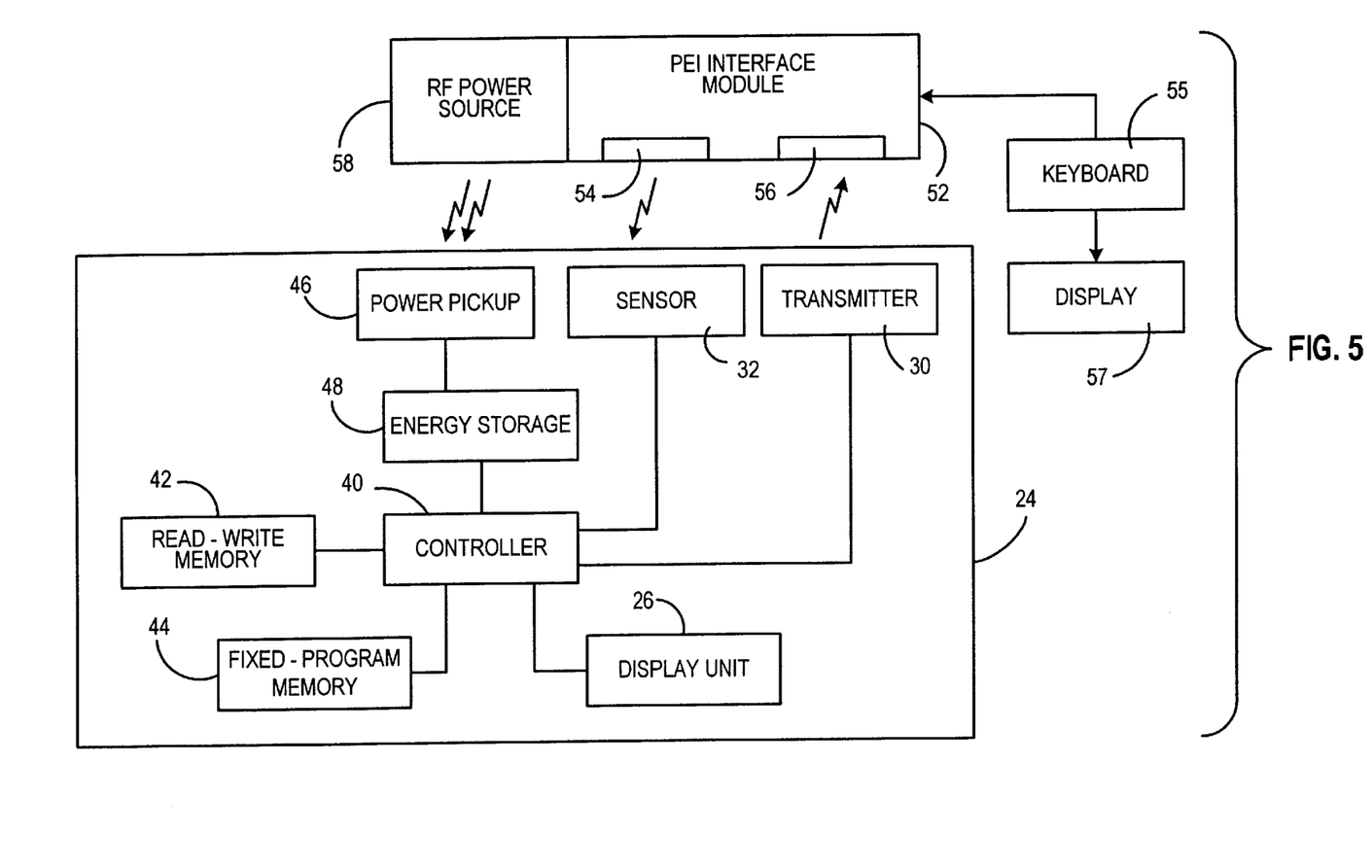
FIG. 5 is a drawing in block form showing how information may be loaded into layer 24 of electronic circuit 19.

FIG. 5 is a drawing in block form showing how information may be loaded into layer 24 of electronic circuit 19. A keyboard 55 is coupled to programmable interface module 52 and display 55. Power source 58 is a radio frequency source for providing energy to circuit 19 when source 58 is in the proximity of circuit 19. Programmable interface module 52 comprises a radio frequency source 54 for transmitting information to controller 40 via sensor 32, and a receiver 56 for receiving information from controller 40 via transmitter 30. Keyboard 55 is used to enter alphanumeric information into programmable interface module 52. Module 52 communicates with layer 24 of electronic circuit 19 and writes to read/write memory 42 the information entered via keyboard 55, namely, the serial number or other identifying characteristics of the materials contained within sealed container 11. Mailer information, i.e., name and address of the mailer, may be entered into fixed memory 44 via keyboard 55, RF source 54, sensor 32 and controller 40. At the same time, module 52 commands controller 40 to activate the display unit 26 to produce the information entered into memories 42 and 44. Display 57 will also indicate the information entered into memories 42 and 44 so that the operator of keyboard 55 may verify that the entered information is correct.

Figure 6:
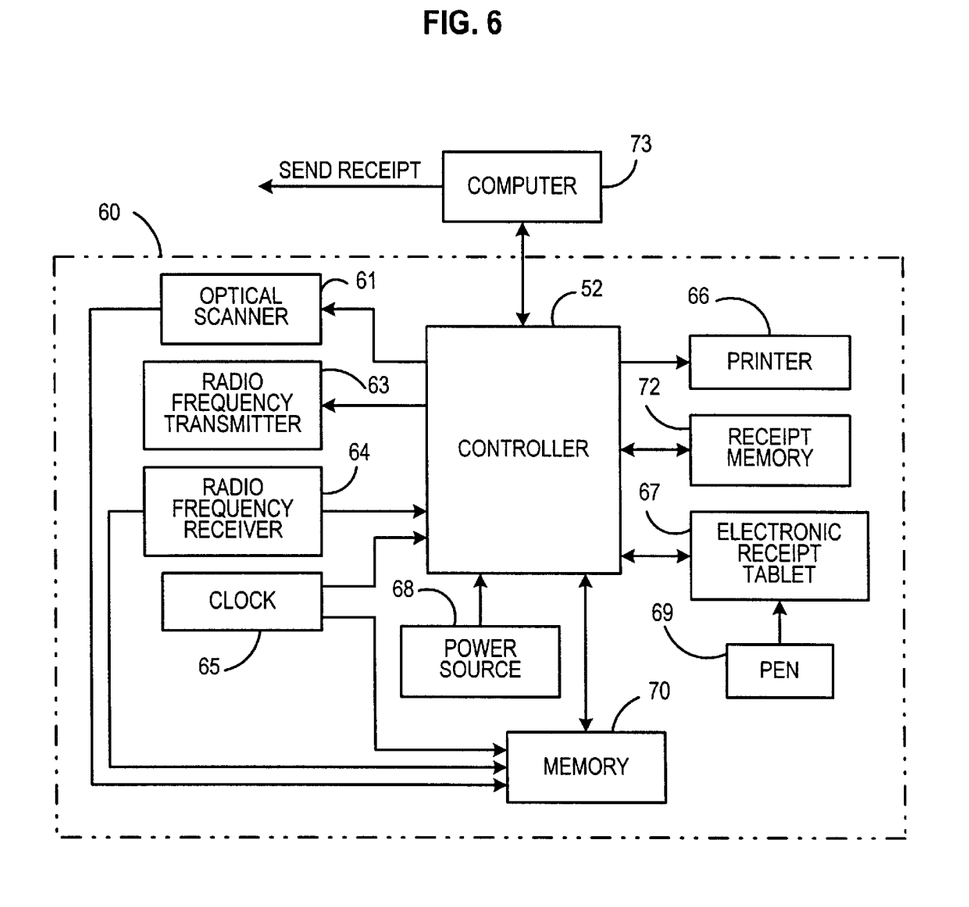
FIG. 6 is a drawing in block form of reading, storage and printing device 60 that is used: to read the information transmitted by layer 24 of circuit 19; to read information appearing on container 11; and to compose a receipt 71 that may be signed by the addressee recipient of container 11.

FIG. 6 is a drawing in block form of reading, storage and printing device 60 that is used: to read the information transmitted by layer 24 of circuit 19; to read information appearing on container 11; and to compose a delivery receipt 71 (FIG. 7) that may be signed by the addressee recipient of sealed container 11. Reading device 60 comprises: an optical scanner 61 that is coupled to a controller 62; a radio frequency transmitter 63 that is coupled to controller 62; a radio frequency receiver 64 that is coupled to controller 62; a date/time clock 65 that is coupled to controller 62; a printer 66 that is coupled to controller 62; an electronic receipt tablet 67 that is coupled to controller 62; a digital pen 69 that is coupled to tablet 67; a memory 70 that is coupled to scanner 61, receiver 64, clock 65 and controller 62, and a power source 68 that is coupled to controller 62. Receipt memory 72 is coupled to controller 62. Digital pen 69 is a pen that writes in traditional ink on paper and simultaneously transmits signals to tablet 67 when writing on paper that is placed over tablet 67. Pen 69 may be the Cross-Writer™ manufactured by the Cross Pen Computing Group of the A.T. Cross Company of Providence, R.I. Tablet 67 may be the CrossPad™ manufactured by the Cross Pen Computing Group of the A.T. Cross Company of Providence, R.I.

When a postal carrier or courier delivers sealed container 11 (FIGS. 1 and 2) to the party indicated in recipient address field 12, the postal carrier or courier uses optical scanner 61, to scan information contained in recipient address field 12 or scan information contained in IBI 18 (FIG. 2). The scanned recipient addressee information is transmitted to memory 70. Then the postal carrier or courier activates radio frequency transmitter 63 so that the information stored in memories 42 and 44 (FIG. 4) will be received by radio frequency receiver 64. The received information about the contents of the material sealed within container 11 is transmitted to memory 70. Clock 65 will now transmit to memory 70 the date and time that controller 62 noted that the aforementioned information was received from scanner 61 and receiver 64.

Figure 7:
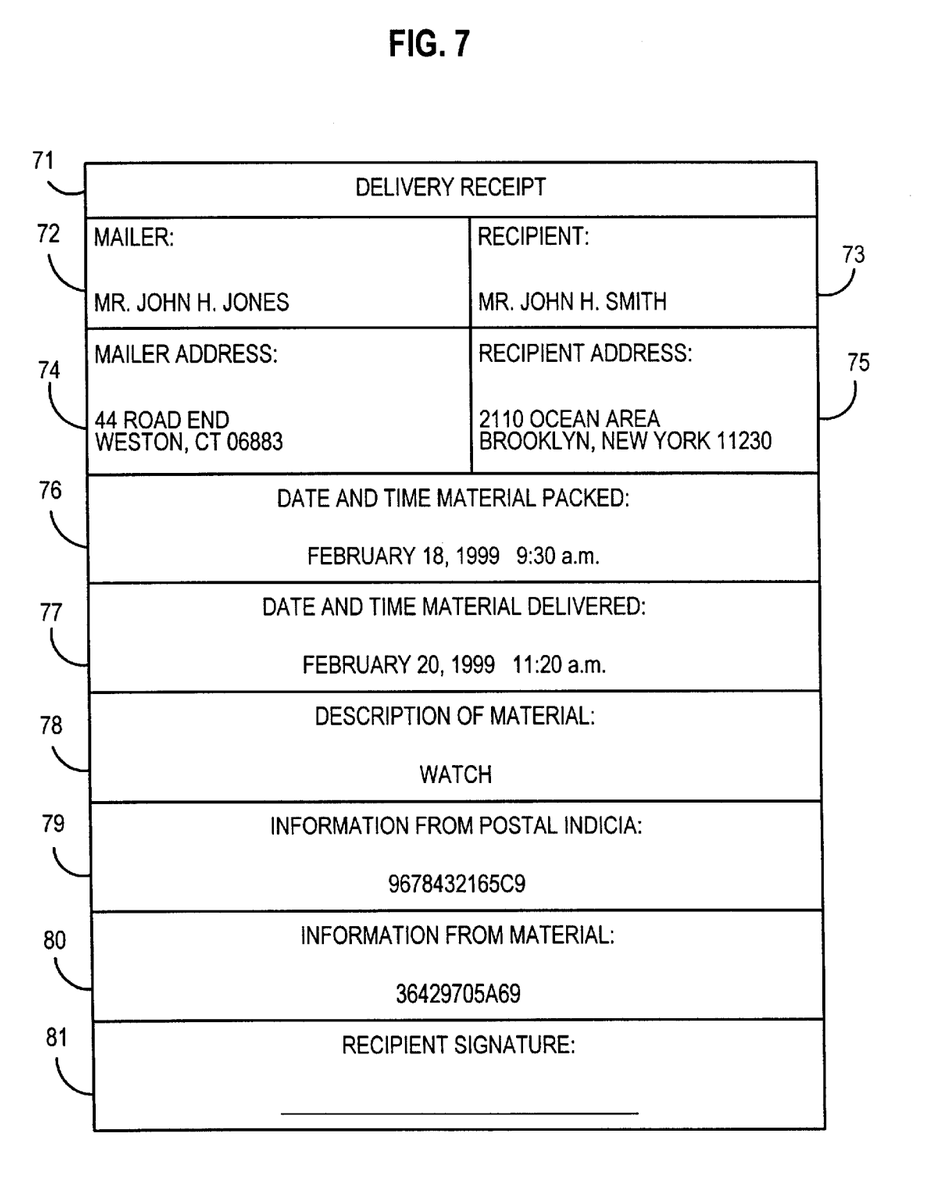
FIG. 7 is a drawing of delivery receipt 71.

Controller 62 will now request that printer 66 use information stored in memory 70 to print receipt 71 (FIG. 7). Controller 62 will also request that electronic receipt tablet 67 display information stored in memory 70. After receipt 71 is printed the postal carrier or courier will give the addressee recipient electronic receipt tablet 67 and receipt 71. The recipient addressee will be asked to confirm that the information appearing on receipt 71 is the same as the information displayed by tablet 67. If the recipient addressee agrees that the information appearing on receipt 71 is the same as the information displayed by tablet 67, the postal carrier or courier will place receipt 71 on top of the display of electronic receipt tablet 67 in a manner that the space reserved for the recipient addressee's signature on receipt 71 will coincide with the space reserved for the addressee's signature on the display of tablet 67. The recipient will now be given tablet 67 with receipt 71 placed on top of tablet 67 and pen 69 and asked to sign receipt 71 in the space provided. When the recipient signs receipt 71, they will also be signing the information displayed by tablet 67. A facsimile copy of the recipient's signature along with the other information displayed on tablet 67 will be stored in memory 72.

Now the postal carrier or courier will give the recipient sealed container 11 and receipt 71. When the postal carrier or courier return to their office they will connect controller 62 to a port on personal computer 73 to upload to computer 73 the information stored in memory 72. Computer 73 will store the uploaded information. A printer (not shown) will print the uploaded information. An operator of computer 73 may transmit to sender 13 (FIGS. 1 and 2) copies of receipt 71 together with the recipient's signature. The operator may transmit the copies of receipt 71 via e-mail, facsimile, regular mail, courier mail, etc.

FIG. 7 is a drawing of delivery receipt 71. Receipt 71 has a space 72 that indicates: the person or entity who mailed sealed container 11 (FIGS. 1 and 2) and a space 74 that indicates the address of the mailer. Space 73 indicates the name of the recipient and space 75 indicates the address of the recipient. The date and time the materials were sealed within container 11 is shown in space 76 and the date and time the materials sealed within container 11 were delivered to the recipient are shown in space 77. A description of the materials is shown in space 78, and information scanned from IBI 18 appears in space 79. Information transmitted from the material sealed within container 11 is shown in space 80. A space 81 is provided for the recipient's signature.

The above specification describes a new and improved system and method for relating the material contained within a sealed mail piece or package to the name and address of the recipient of the mail piece or package. It is realized that the above description may indicate to those skilled in the art additional ways in which the principles of this invention may be used without departing from the spirit. It is, therefore, intended that this invention be limited only by the scope of the appended claims.

What is claimed is:

1. A method for relating material contained inside a container with recipient information appearing on the outside of the container, the method comprising the steps of:

affixing identifying characteristics about the material to the material contained within the container wherein the affixing to the material comprises an electronic circuit that has a radio frequency output that identifies the material that is contained within the container;

sealing the container along with the material contained within the container;

delivering the container along with the material contained within the container to a recipient;

reading recipient information appearing on the outside of the container and the identifying characteristics of the material contained within the container without opening the container; and recording recipient information appearing on the outside of the container and the identifying characteristics of the material contained within the container without opening the container.

2. The method claimed in claim 1, further including the steps of:

confirming that the recorded recipient information is correct.

3. The method claimed in claim 1, further including the steps of:

confirming that the identifying characteristics of the material contained within the container information is correct.

4. The method claimed in claim 1, further including the steps of:

having the recipient sign the recorded information.

5. The method claimed in claim 4, further including the steps of:

giving the recipient a signed copy of the recorded information.

6. The method claimed in claim 4, further including the steps of:

giving a mailer of the material contained within the container a signed copy of the recorded information.

7. The method claimed in claim 1, wherein the identifying characteristics affixed to the material contained within the container are displayed in the form of an encrypted code.

8. The method claimed in claim 1, wherein the identifying characteristics affixed to the material contained within the container are displayed in alphanumeric characters.

9. The method claimed in claim 1, wherein an Information Based Indicia appearing on the outside of the container is read in the reading step to obtain recipient information.

10. A system for relating material contained inside a sealed container that has been sent by a mailer and delivered to a recipient with recipient information appearing on the outside of the sealed container, the system comprising:

means affixed to the material for identifying the material; wherein the affixing to the material comprises an electronic circuit that has a radio frequency output that identifies the material that is contained within the container means for reading recipient information appearing on the outside of the container;

means for reading the identifying means without opening the container; and means coupled to the reading identifying means and the reading recipient means for recording the read information without opening the container.

11. The system claimed in claim 10, wherein the means affixed to the material is programmable by a mailer.

12. The system claimed in claim 10, wherein the means affixed to the material is programmable by a mailer to uniquely identify the material.

13. The system claimed in claim 11, wherein the means affixed to the material displays information identifying the material.

14. The system claimed in claim 10, wherein the electronic circuit is frangible.

15. The system claimed in claim 10, further including a printer coupled to the recording means for printing the recorded information.

16. A method for relating mailer sent material that has identifying characteristics affixed thereto contained inside a sealed container that has been delivered to a recipient identified on the outside of the sealed container, wherein the affixing to the material comprises an electronic circuit that has a radio frequency output that identifies the material that is contained within the container the method comprising the steps of:

reading recipient information appearing on the outside of the container and the identifying characteristics of the material contained within the container without opening the container; and recording recipient information appearing on the outside of the container and the identifying characteristics of the material contained within the container without opening the container.

17. The method claimed in claim 16, further including the steps of:

confirming that the recorded information is correct.

18. The method claimed in claim 17, further including the steps of:

having the recipient sign the recorded information.

19. The method claimed in claim 18, further including the steps of:

giving the mailer a signed copy of the recorded information.

20. The method claimed in claim 18, further including the steps of:

giving a mailer the recipient a signed copy of the recorded information.

21. The method claimed in claim 16, wherein the identifying characteristics of the material contained within the container is unique.

* * * * *